(12) United States Patent
Oda et al.

(10) Patent No.: US 10,120,158 B2
(45) Date of Patent: Nov. 6, 2018

(54) VIBRATION-TYPE ACTUATOR AND OPTICAL DEVICE USING THE SAME

(71) Applicant: CANON KABUSHIKI KAISHA, Tokyo (JP)

(72) Inventors: Yuki Oda, Yokohama (JP); Masanori Takahashi, Chigasaki (JP); Makoto Shihoh, Yokohama (JP); Daisuke Yokoyama, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 321 days.

(21) Appl. No.: 14/800,988

(22) Filed: Jul. 16, 2015

(65) Prior Publication Data

US 2016/0020710 A1    Jan. 21, 2016

(30) Foreign Application Priority Data

Jul. 16, 2014  (JP) ................................. 2014-145781
Jul. 10, 2015  (JP) ................................. 2015-138847

(51) Int. Cl.
*H02N 2/02* (2006.01)
*G02B 7/04* (2006.01)
*H02N 2/00* (2006.01)

(52) U.S. Cl.
CPC ............. *G02B 7/04* (2013.01); *H02N 2/0055* (2013.01); *H02N 2/026* (2013.01)

(58) Field of Classification Search
CPC ...... H02N 2/026; H02N 2/005; H02N 2/0055; H02N 2/02; H01L 41/053
USPC ........................................ 310/323.01–323.21
See application file for complete search history.

(56) References Cited

U.S. PATENT DOCUMENTS

| | | | |
|---|---|---|---|
| 6,218,767 B1 | 4/2001 | Akada et al. | |
| 7,245,058 B2 | 7/2007 | Fujimoto et al. | |
| 8,643,252 B2 | 2/2014 | Oda et al. | |
| 8,816,568 B2 | 8/2014 | Seki et al. | |
| 2009/0140608 A1* | 6/2009 | Kasai | G02B 7/08 |
| | | | 310/323.16 |

(Continued)

FOREIGN PATENT DOCUMENTS

| | | |
|---|---|---|
| JP | 09-047044 A | 2/1997 |
| JP | 2011-239571 A | 11/2011 |
| JP | 2014-093871 A | 5/2014 |

*Primary Examiner* — Derek Rosenau
(74) *Attorney, Agent, or Firm* — Fitzpatrick, Cella, Harper & Scinto

(57) ABSTRACT

A vibration-type actuator can be miniaturized and can stabilize a pressure state between a driven body and a vibration body. A pressurizing unit applies a pressure force between projections on the vibration body and the driven body. A piezoelectric device connected to the vibration body on a surface opposite to the projections moves the driven body by vibration occurring in the vibration body when a drive voltage is applied. The pressurizing unit includes an energizing member, its support member, and a transfer member. A length of a contact area between the projections and the driven body is shorter than a length of an area in which the transfer member transfers the pressure force from the energizing member to the vibration body and a length of a contact area between the energizing member and the support member, in a direction perpendicular to the moving direction and to a pressurizing direction by the pressurizing unit.

13 Claims, 11 Drawing Sheets

(56) References Cited

U.S. PATENT DOCUMENTS

2013/0033771 A1* 2/2013 Oikawa ............... H02N 2/0055
359/824
2014/0125200 A1 5/2014 Oda et al.

* cited by examiner

A-MODE

B-MODE

VIBRATION-TYPE ACTUATOR AND OPTICAL DEVICE USING THE SAME

BACKGROUND OF THE INVENTION

Field of the Invention

The present invention relates to a vibration-type actuator and an optical device using this, and in particular, relates to a technique to miniaturize a vibration-type actuator and to stabilize its drive state.

Description of the Related Art

A vibration-type actuator generally has an electro-mechanical energy conversion element, a vibration body in which drive vibration is excited by the element, and a driven body that is in pressure contact with the vibration body, and moves the vibration body and the driven body relatively by drive vibration. FIG. 11A is a perspective view schematically showing a configuration of the vibration-type actuator 110 of a well-known linear type.

The vibration-type actuator 110 has a tabular vibration body 111, first and second projections 112 on one side of the vibration body 111, a piezoelectric device 113 that is an electro-mechanical energy conversion element attached to the other side of the vibration body 111, and a driven body (not shown) that is in pressure contact with the projections 112. It should be noted that a three-dimensional orthogonal coordinate system is set up for description as shown in FIG. 11A. An X-direction connects the two projections 112, and is a relative moving direction of the vibration body 111 and the driven body here. A Z-direction is a thickness direction of the vibration body 111, and a Y-direction is perpendicular to both of the X- and Z-directions. Accordingly, the piezoelectric device 113 is adhered on the X-Y plane of the vibration body 111.

FIG. 11B and FIG. 11C are views for describing two bending vibration modes that are drive vibrations generated in the vibration body 111 by applying drive voltage to the piezoelectric device 113. One bending vibration mode (hereinafter referred to as an "A-mode") shown in FIG. 11B is a quadric curvature movement in the X-direction in which three nodes parallel to the Y-direction appear. The projections 112 are arranged near the positions of the nodes in the vibration in the A-mode, and reciprocate in the X-direction by the vibration in the A-mode.

The other vibration mode (hereinafter referred to as a "B-mode") shown in FIG. 11C is a linear flexing vibration in the Y-direction in which two nodes parallel to the X-direction appear. The projections 112 are arranged near the position of antinodes in the vibration in the B-mode, and reciprocate in the Z-direction by the vibration in the B-mode.

The vibration-type actuator 110 generates elliptic motion or circular motion at the top ends of the projections 112 by generating the vibrations in the A-mode and B-mode at predetermined phase difference. At this time, the driven body is in pressure contact with the top ends of the projections 112 on the vibration body 111 by a pressurizing means (not shown). Accordingly, friction drive force is given to the driven body in the X-direction, and the vibration body 111 and the driven body move relatively.

There is a known method to press the driven body against the projections 112 with attraction force of a magnet arranged at the back side (the side of the piezoelectric device 113) of the vibration body 111 as an example of a method by which the driven body is in pressure contact with the projections 112 (see Japanese Laid-Open Patent Publication (Kokai) No. 2011-239571 (JP 2011-239571A)).

However, the method to press the driven body against the projections 112 using the magnet as described in the above-mentioned publication needs a thick magnet in order to obtain sufficient pressure force when the projected area of the magnet viewed in the Z-direction is small. Accordingly, there is a problem that it is not easy to attain a miniaturization. Moreover, when the projections 112 are small, the pressure force may not be stabilized and sufficient driving force may not occur because the attraction force also operates between the vibration body 111 and the driven body.

SUMMARY OF THE INVENTION

The present invention provides a vibration-type actuator that is capable of miniaturizing and of stabilizing pressure state between a driven body and a vibration body.

Accordingly, a first aspect of the present invention provides a vibration-type actuator including a vibration body including a first projection on a first surface, a driven body in pressure contact with the projection, a pressurizing unit configured to apply pressure force between the projection and the driven body, and an electro-mechanical energy conversion element connected to a second surface of the vibration body. The pressurizing unit includes an energizing member, a support member configured to support the energizing member, and a transfer member configured to transfer the pressure force occurred in the energizing member to the vibration body. The second surface is opposite to the first surface. The electro-mechanical energy conversion element and the vibration body are configured to change a relative position of the vibration body and the driven body by occurring vibration in the vibration body when drive voltage is applied to the electro-mechanical energy conversion element. In a direction that intersects perpendicularly with a relative moving direction of the vibration body and the driven body and that intersects perpendicularly with a pressurizing direction by the pressurizing unit, a length of an area in which the projection is in contact with the driven body is shorter than either of a length of an area in which the transfer member transfers the pressure force to the vibration body and a length of an area in which the energizing member is in contact with the support member.

Accordingly, a second aspect of the present invention provides an optical device including a lens, and the vibration-type actuator according to the first aspect.

According to the present invention, since the miniaturization of the vibration-type actuator is attained and the pressure state between the driven body and the vibration body is stabilized, drive performance is stabilized.

Further features of the present invention will become apparent from the following description of exemplary embodiments with reference to the attached drawings.

BRIEF DESCRIPTION OF THE DRAWINGS

FIG. 7 is applied.

DESCRIPTION OF THE EMBODIMENTS

Hereafter, embodiments according to the present invention will be described in detail with reference to the drawings.

Figure 1A:
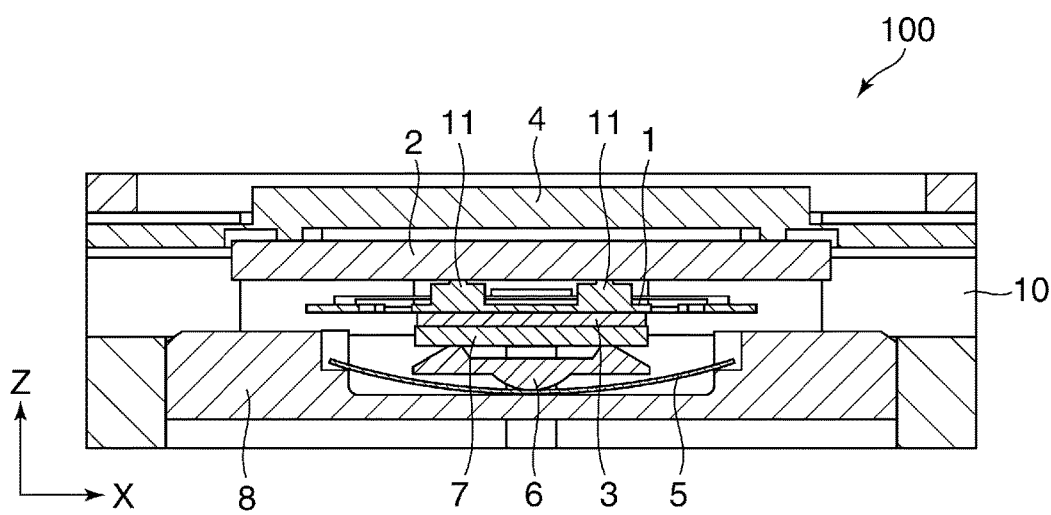
FIG. 1A and FIG. 1B are sectional views schematically showing a configuration of a vibration-type actuator according to a first embodiment of the present invention.
Figure 1B:
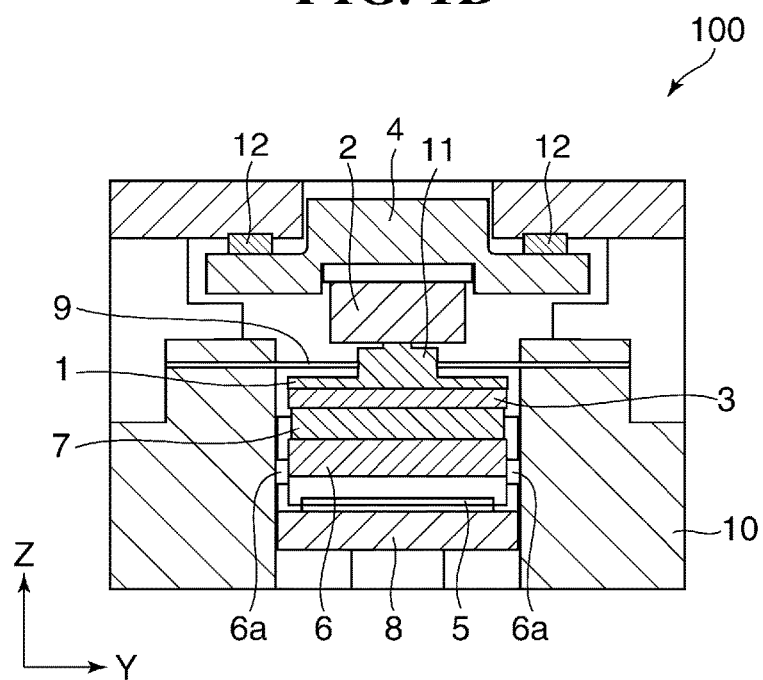
Figure 2:
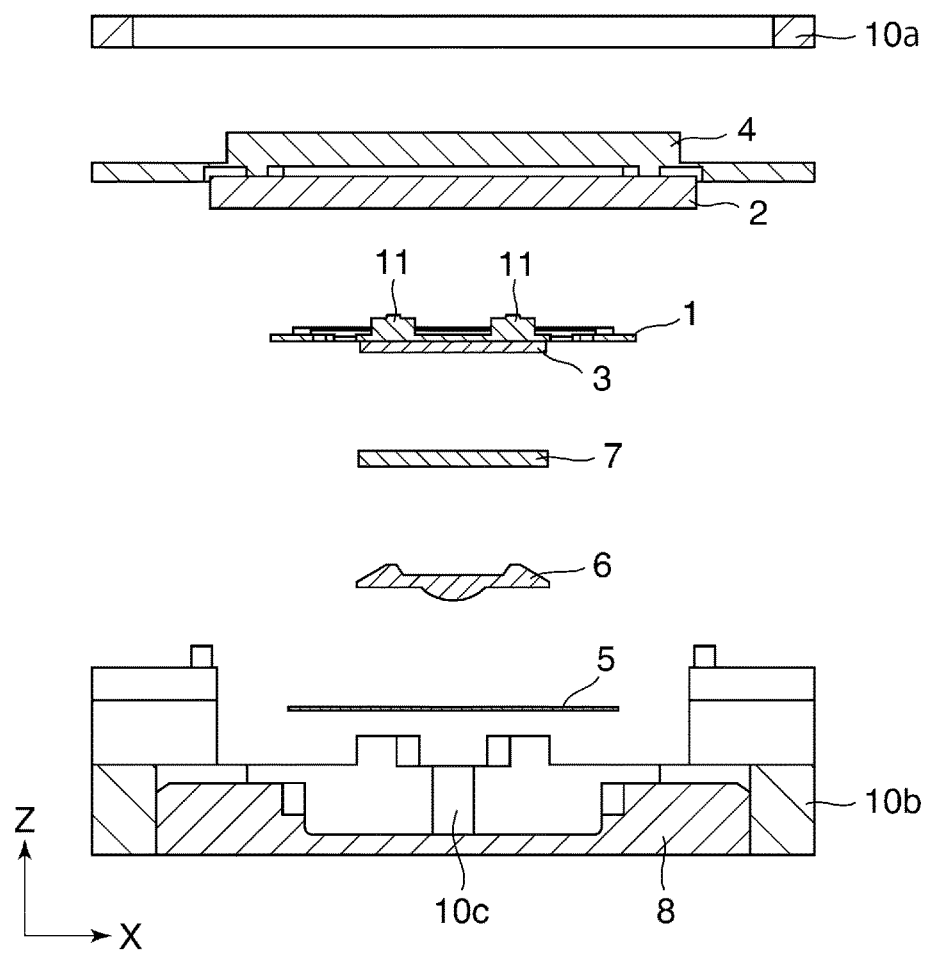
FIG. 2 is an exploded view of the vibration-type actuator within a section shown in FIG. 1A.

FIG. 1A and FIG. 1B are sectional views schematically showing a configuration of a vibration-type actuator 100 according to a first embodiment. FIG. 2 is an exploded view of the vibration-type actuator 100 within a section shown in FIG. 1A. The vibration-type actuator 100 is provided with a vibration body 1, a driven body 2, a piezoelectric device 3, a driven-body support member 4, a flat spring 5, a pressure receiving member 6, a pressure transfer member 7, a flat-spring support member 8, a vibration-body support member 9, an exterior member 10, and a linear guide member 12. An X-direction shown in the drawing is a longitudinal direction of the vibration-type actuator 100, and is a driving direction of the driven body 2. A Y-direction is a width direction of the vibration-type actuator 100, and a Z-direction is a thickness direction (pressurizing direction) of the vibration-type actuator 100.

In the vibration-type actuator 100, the vibration body 1 and the piezoelectric device 3 constitute a drive unit (actuator). Two projections 11 are provided side by side on one surface (an upper face (a surface of the side of the driven body)) of the vibration body 1 in the X-direction. Moreover, the piezoelectric device 3, which is an electro-mechanical energy conversion element, is joined to the bottom (a surface of the side opposite to the upper surface on which the projections 11 are provided) of the vibration body 1. Since conditions of the arrangement of the projections 11 on the vibration body 1 and a method of exciting drive vibration to the vibration body 1 are the same as the conditions of the arrangement of the projections 112 on the vibration body 111 and the method of exciting drive vibration to the vibration body 111, the descriptions are omitted here.

In the vibration-type actuator 100, the driven body 2 that is driven by the drive unit and the driven-body support member 4 that supports the driven body 2 constitute a driven unit (a driven part). The driven body 2 and the driven-body support member 4 are united and arranged so as to be movable in the X-direction guided by the linear guide member 12 extending in the X-direction. The linear guide member 12 is disposed between the exterior member 10 and the driven-body support member 4 and thus regulates the movement of the driven-body support member 4 to the exterior member 10 so that the relative moving direction of the driven-body support member 4 to the vibration body 1 is in the X-direction. It should be noted that the driven unit is not necessarily consisting of two members that are the driven body 2 and the driven-body support member 4. As the linear guide member 12, any member is available as long as it regulates the driving direction, and a linear ball slide, etc., may be employed, for example. Moreover, at least the driven body 2 of the driven-body support member 4 and the linear guide member 12 are arranged such that when viewed at least in a direction (Y-direction) which intersects perpendicularly with both the relative moving direction and the pressurizing direction, the driven body 2 and the driven-body support member 4 overlap with each other. In other words, the driven body 2 and the linear guide member 12 are arranged such that when viewed in the Z-direction, the driven body 2 and the linear guide member 12 do not overlap with each other, thereby attaining thinning of the vibration-type actuator 100.

The flat spring 5, the pressure receiving member 6, the pressure transfer member 7, and the flat-spring support member 8 constitute a pressurizing unit (a pressure part). The flat spring 5 has a flat shape in a single state as shown in FIG. 2. However, the flat spring 5 is held in a bent shape as shown in FIG. 1A when it is built in the vibration-type actuator 100, and is an energizing member that generates pressure force (energization force). The pressure force that occurs by bending the flat spring 5 acts on the vibration body 1 through the pressure receiving member 6 and the pressure transfer member 7, and makes the projections 11 on the vibration body 1 be in pressure contact with the driven body 2.

The flat-spring support member 8 supports the flat spring 5. The flat-spring support member 8 is slid along a wall of the exterior member 10 in the X-direction, and the flat-spring support member 8 is positioned against the exterior member 10 with a set screw (not shown), etc., when the flat spring 5 is bent in a predetermined flexure amount. When the flat spring 5 applies predetermined pressure force to the vibration body 1 through the pressure receiving member 6 and the pressure transfer member 7, the projections 11 are in pressure contact with the driven body 2, and the driven body 2 is frictionally driven by the drive vibration excited in the vibration body 1.

Figure 12:
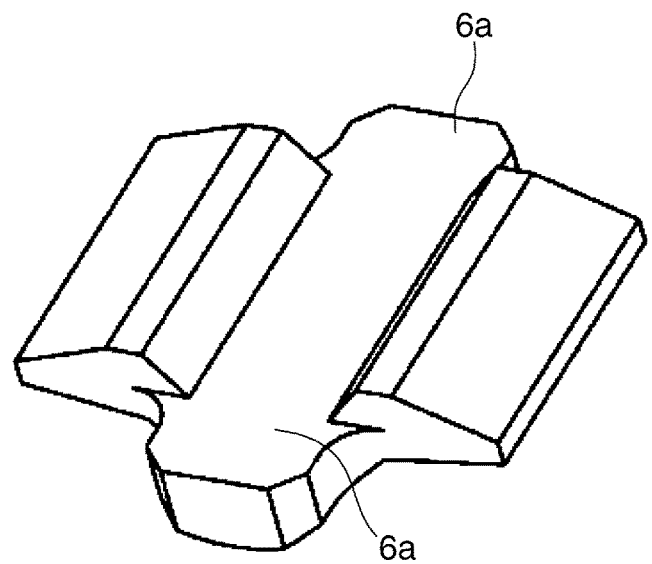
FIG. 12 is a perspective view showing an entire shape of a pressure receiving member shown in FIG. 1A.

The pressure transfer member 7 is felt, for example. Since the pressure transfer member 7, which is felt, is arranged between the pressure receiving member 6 and the piezoelectric device 3, the pressure force from the flat spring 5 is dispersed. This prevents the pressure receiving member 6 from biting into the piezoelectric device 3, and prevents the piezoelectric device 3 from being damaged by concentrating the pressure force to the corners of the pressure receiving member 6. Moreover, for example, the pressure receiving member 6 may have two projections 6a projected in the Y-direction from a center portion thereof (see FIG. 12). In this case, the exterior member 10 has two concave portions 10c (only one of them is shown in FIG. 1A and FIG. 2) into which the two projections 6a are respectively fitted. A position of the pressure receiving member 6 regarding the X-Y plane direction (which is defined by the X-direction and the Y-direction) is fixed by fitting the two projections 6a into the two concave portions 10c. On the other hand, the two concave portions 10c do not regulate the movement of the pressure receiving member 6 in the pressurizing direction. Although the pressure receiving member 6 is in contact with the pressure transfer member 7 at two faces (two positions) in the vibration-type actuator 100, it may contact at three or more faces or it may contact on the whole face.

The contact portion of the pressure receiving member 6 with the flat spring 5 is formed in a rounded-projection shape in the X-Z plane. Accordingly, even if the vibration body 1 and the pressure receiving member 6 integrally incline on an axis in a direction (the Y-direction) that is perpendicular to the driving direction due to inclination, etc., of the driven body 2, the change of the pressure force between the vibration body 1 and the driven body 2 is suppressed.

The vibration-body support member 9 positions the vibration body 1 against the exterior member 10 at the position where the projections 11 on the vibration body 1 are in contact with the driven body 2. Moreover, the vibration-body support member 9 is made from elastic material, and accordingly, always holds the two projections 11 and the driven body 2 in the contact state stably during the drive of the vibration body 1. Material of which rigidity is lower than that of the vibration body 1, such as SUS303, SUS304, and phosphor bronze, is preferable as the elastic material constituting the vibration-body support member 9. Moreover, even if rigidity of elastic material is higher than that of the vibration body 1, it is allowable as long as the rigidity of the vibration-body support member 9 is lower than that of the vibration body 1 due to the shape like thickness.

The exterior member 10 constitutes the external appearance of the vibration-type actuator 100, and enables to hold the above-mentioned various members. The exterior member 10 consists of a first exterior member 10a that supports the driven body 2 and a second exterior member 10b that supports the vibration body 1. The vibration-type actuator 100 is constituted by putting the drive unit, the driven unit, and the pressurizing unit between the first exterior member 10a and the second exterior member 10b.

Figure 3:
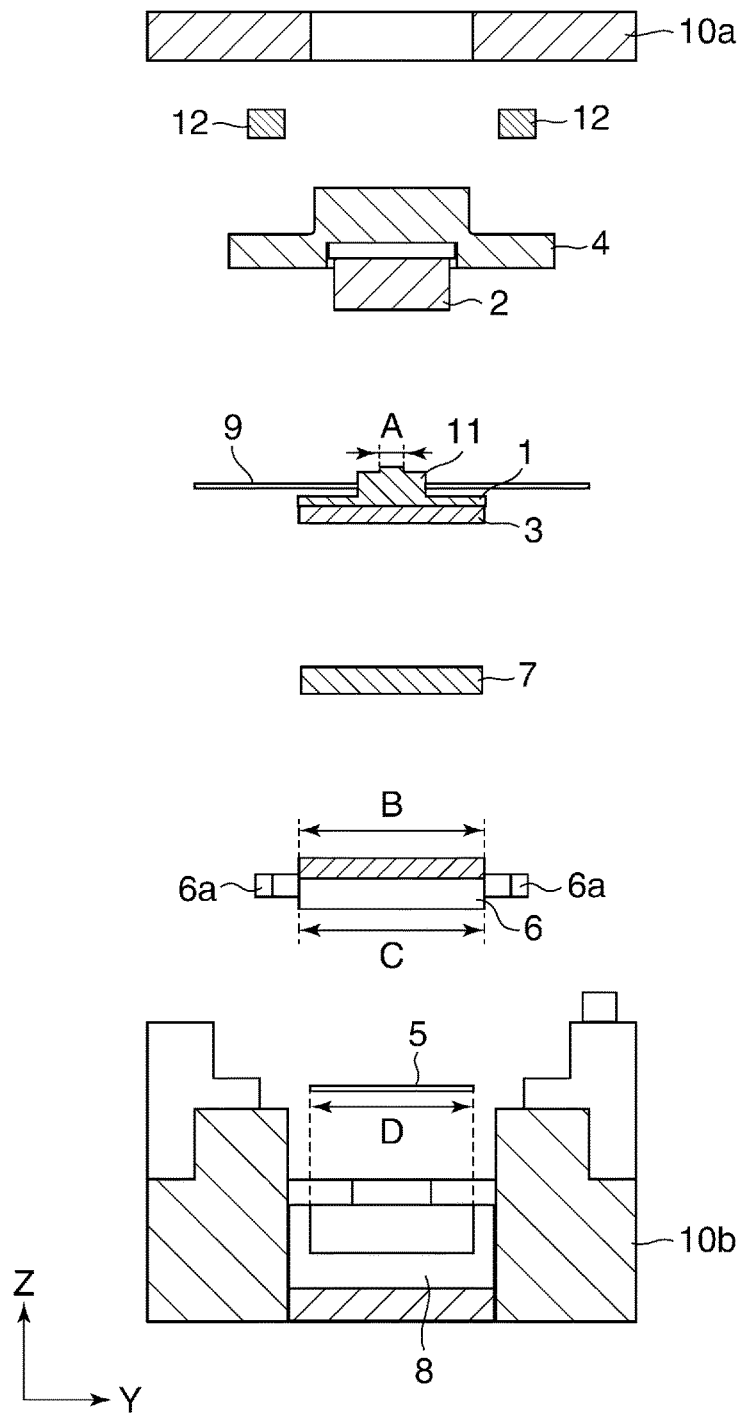
FIG. 3 is an exploded view of the vibration-type actuator within a section shown in FIG. 1B.

FIG. 3 is a view showing the vibration-type actuator 100 in a state where the drive unit, the driven unit, and the pressurizing unit are exploded, viewed in the driving direction (the X-direction). A length of the contact area between the projections 11 and the driven body 2 in the direction (the Y-direction) that intersects perpendicularly with the driving direction is set to "A", and a length of the area that transfers the pressure force to the driven body 2 is set to "B". Moreover, a length of the area that transfers the pressure force between the pressure receiving member 6 and the flat spring 5 in the direction (the Y-direction) that intersects perpendicularly with the driving direction is set to "C", and a length of the area that transfers the pressure force between the flat spring 5 and the flat-spring support member 8 is set to "D". It should be noted that the length B is equal to the length of the area that transfers the pressure force between the pressure receiving member 6 and the pressure transfer member 7 in this embodiment.

The vibration-type actuator 100 is designed so that the lengths B, C, and D become longer than the length A (the relationships of A<B, A<C, and A<D are held). That is, the length of the pressure transfer area in which the pressure force is transferred to the vibration body 1 from the pressurizing unit is longer than the length of the contact area between the vibration body 1 and the driven body 2. Accordingly, even if the contact state between the vibration body 1 and the driven body 2 varies, the state of the pressurizing unit does not vary, which enables to give the stable pressure force to the vibration body 1.

Moreover, the vibration-type actuator 100 is preferably designed so that the line that connects the centers of the two projections 11 in the X-Y plane when the vibration body 1 is viewed in the Z-direction coincides with the center line of the vibration body 1 in the width direction (the Y-direction). That is, when the vibration body 1 is viewed in the Z-direction, it is preferable that the centers of the two projections 11 are located on the center line of the vibration body 1 in the width direction. However, the line connecting the centers of the two projections 11 may deviate from the center line of the vibration body 1 because of a machining error in a process for forming the projections 11.

Figure 4:
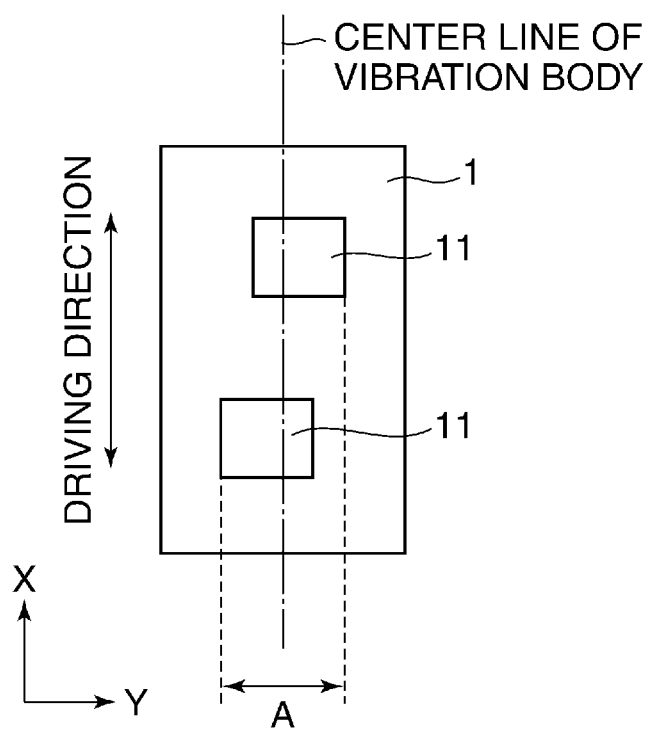
FIG. 4 is a view schematically showing a state where a center line connecting projections of a vibration body that constitutes the vibration-type actuator shown in FIG. 1A is shifted from a center line of the vibration body.

FIG. 4 is a view schematically showing a state in which the center line connecting the projections 11 deviates from the center line of the vibration body 1. When the line connecting the two projections 11 viewed in the Z-direction deviates from the center line of the vibration body 1 in the width direction, the length A is not the length of the single projection 11 but shall be the maximum length including the deviation between the two projections 11 as shown in FIG. 4. The relationships of "A<B, A<C, and A<D" are held even in this case, which enables to stabilize the contact state between the vibration body 1 and the driven body 2. Since the driving direction of the driven unit is regulated only in the X-direction by the linear guide member 12, the driven unit is allowed to be driven in the X-direction even if inescapable deviation resulting from a machining error occurs in the positions of the projections 11 in the Y-direction.

Figure 5A:
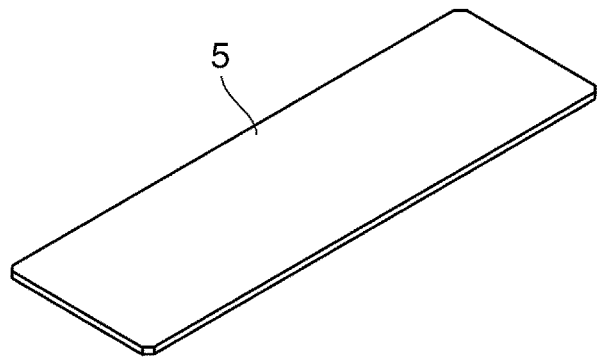
FIG. 5A, FIG. 5B, and FIG. 5C are perspective views showing examples of shapes of flat springs used for the vibration-type actuator shown in FIG. 1A.
Figure 5B:
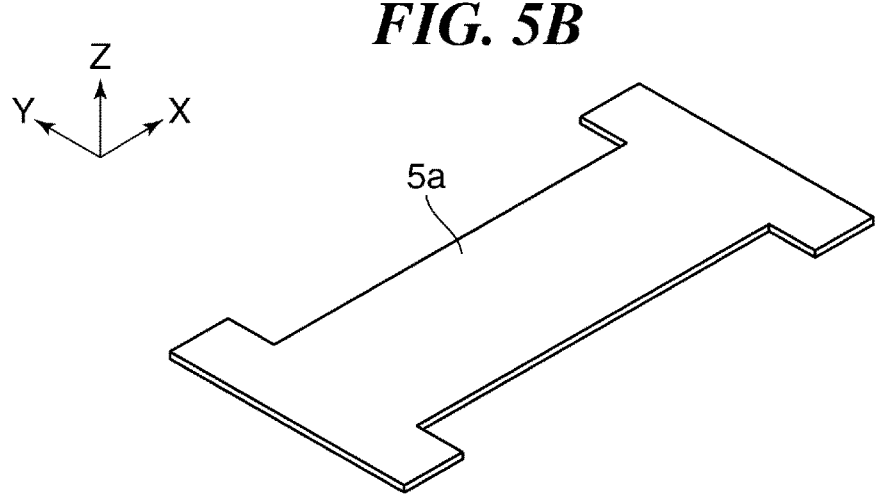
Figure 5C:
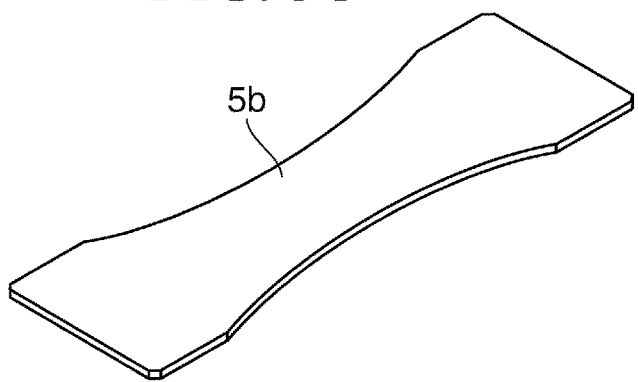

FIG. 5A, FIG. 5B, and FIG. 5C are perspective views showing examples of shapes of flat springs. The flat spring 5 of a rectangular shape as shown in FIG. 5A is usually used. However, the flat spring is not limited to the rectangular shape. An approximately H-shaped flat spring 5a of which a width of both ends in the long-side direction is widened as shown in FIG. 5B, and a flat spring 5b of which a width in a central part in a long-side direction is narrowed as shown in FIG. 5C may be used as the flat spring.

Figure 6:
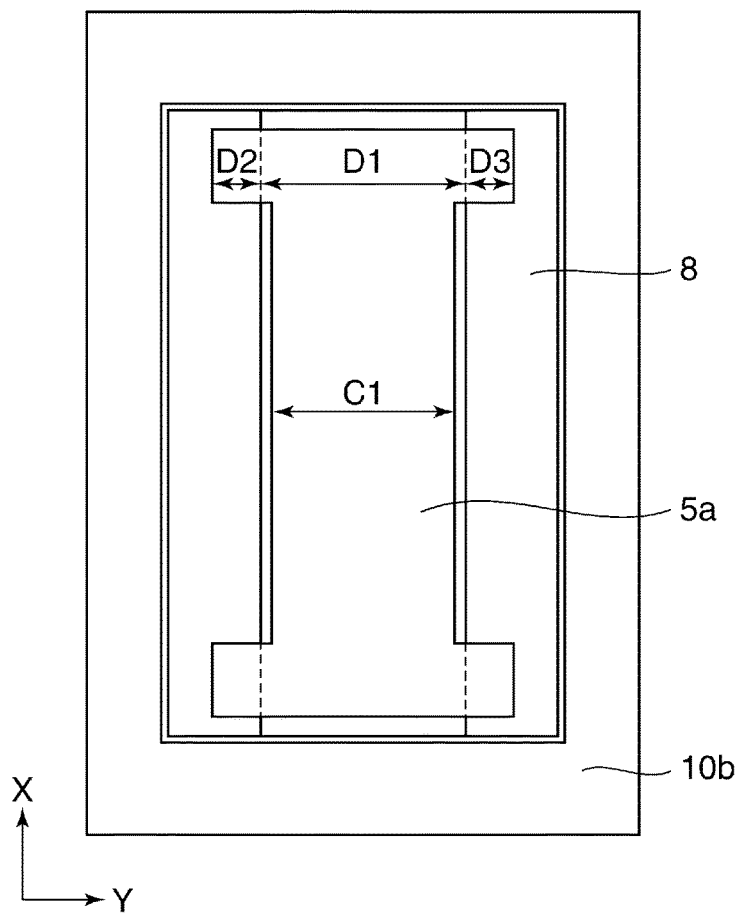
FIG. 6 is a plan view showing a positional relationship between a flat-spring support member and an exterior member in a case where the flat spring shown in FIG. 5B is applied to the vibration-type actuator shown in FIG. 1A.

FIG. 6 is a plan view (viewed from the side of the vibration body 1 (from the upside in the Z-direction)) showing a positional relationship between the flat-spring support member 8 and the exterior member 10 when the flat spring 5a shown in FIG. 5B is used. When the flat spring 5a is used, the length in the width direction of the area that transfers the pressure force to the pressure receiving member 6 (not shown) from the flat spring 5a is the width C1 of the central narrow portion of the flat spring 5a shown in FIG. 6. Moreover, the length D in the width direction of the area that transfers the pressure force between the flat spring 5a and the flat-spring support member 8 is equal to the total length of the lengths D1, D2, and D3 shown in FIG. 6 (i.e., the length of the wide portion at the ends in the longitudinal direction).

Even in this case, since the lengths B, C1, and D1+D2+D3 are longer than the length A (A<B, A<C1, and A<(D1+D2+D3)), the same effect as in the case where the flat spring 5 of the rectangular shape is used is obtained. Moreover, since the use of the flat spring 5a enables to shorten the length in the driving direction (X-direction), the miniaturization is attained, and the flat-spring support member 8 and the second exterior member 10b of the exterior member 10 can be unified to reduce a component count.

Also when the flat spring 5b shown in FIG. 5C is used, the actuator is designed as with the case where the flat spring 5a is used, and the same effect as the case where the flat spring 5a is used is obtained. Moreover, since the flat spring 5b lowers the spring stiffness, variation of the pressure force can be suppressed even if deviation occurs when the flat-spring support member 8 is fixed to the exterior member 10.

Figure 7:
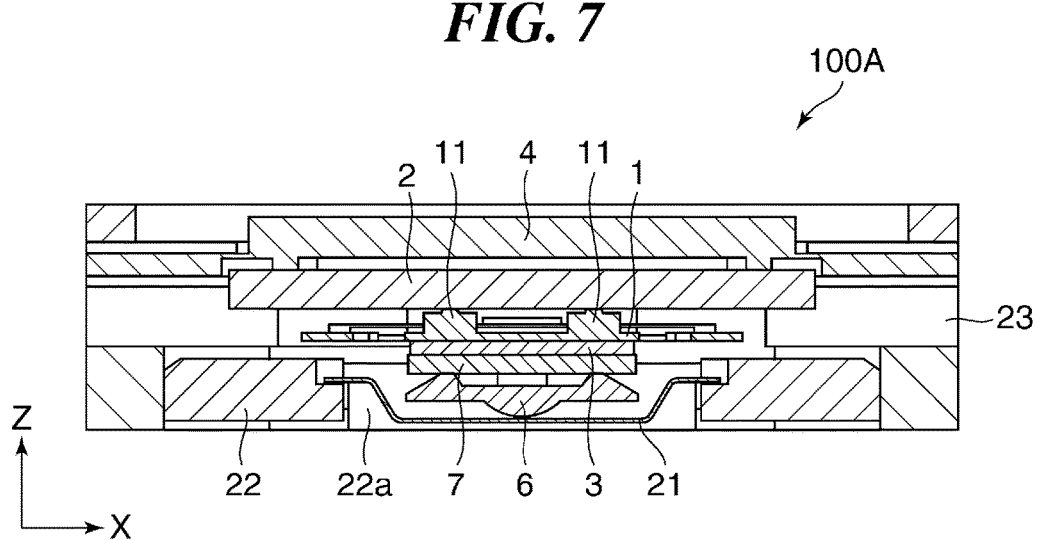
FIG. 7 is a sectional view schematically showing a configuration of a vibration-type actuator according to a second embodiment of the present invention.
Figure 8:
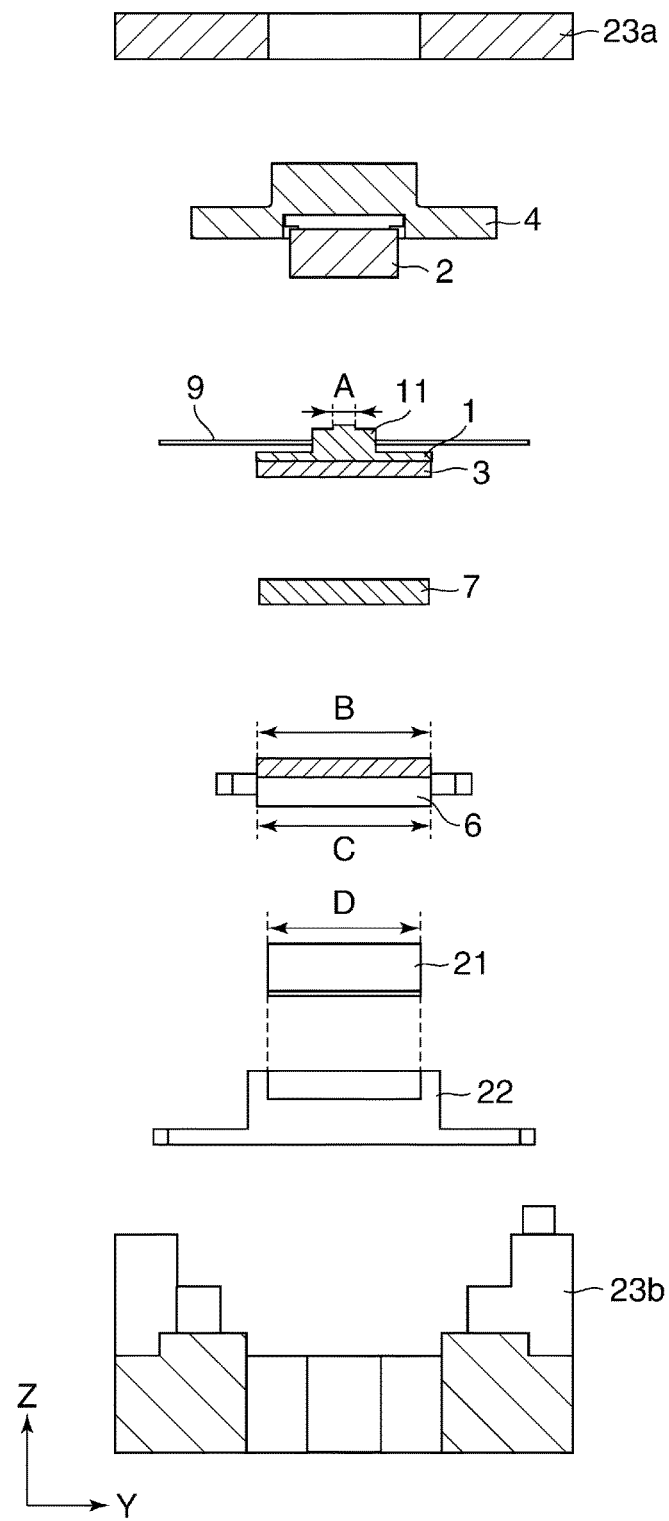
FIG. 8 is an exploded view of the vibration-type actuator shown in FIG. 7.

FIG. 7 is a sectional view schematically showing a configuration of a vibration-type actuator 100A according to a second embodiment. Moreover, FIG. 8 is an exploded view of the vibration-type actuator 100A. An X-direction, a Y-direction, and a Z-direction are defined to the vibration-type actuator 100A according to the second embodiment in the same manner as to the vibration-type actuator 100 according to the first embodiment.

The vibration-type actuator 100A is provided with the vibration body 1, the driven body 2, the piezoelectric device 3, the driven-body support member 4, the pressure receiving member 6, and the pressure transfer member 7. Since these parts are substantially identical to that with which the vibration-type actuator 100 is provided and the configuration and function of each part are the same, the same references are attached and descriptions are omitted.

The vibration-type actuator 100A is provided with a flat spring 21, a flat-spring support member 22 that supports the flat spring 21, and an exterior member 23. Although the flat spring 21, the flat-spring support member 22, and the exterior member 23 respectively correspond to the flat spring 5, the flat-spring support member 8, and the exterior member 10 of the vibration-type actuator 100 according to the first embodiment, they will be described with attaching different references in the following.

The flat-spring support member 22 is slid along a wall of the exterior member 23, and the flat-spring support member 22 is positioned against the exterior member 23 with a set screw (not shown), etc., when the flat spring 21 is bent in a predetermined flexure amount. Accordingly, the flat spring 21 applies predetermined pressure force to the vibration body 1 through the pressure receiving member 6 and the pressure transfer member 7.

It should be noted that the flat spring 21 shown in FIG. 8 is in a single state where load is not applied. The exterior member 23 consists of a first exterior member 23a and a second exterior member 23b. The contact portion of the pressure receiving member 6 with the flat spring 21 is formed in a convex-R shape as with the vibration-type actuator 100 according to the first embodiment. Accordingly, even if the vibration body 1 and the pressure receiving member 6 integrally incline on an axis in a direction (the Y-direction) that is perpendicular to the driving direction due to inclination, etc., of the driven body 2, the change of the pressure force between the two projections 11 and the driven body 2 is suppressed.

Figure 9A:
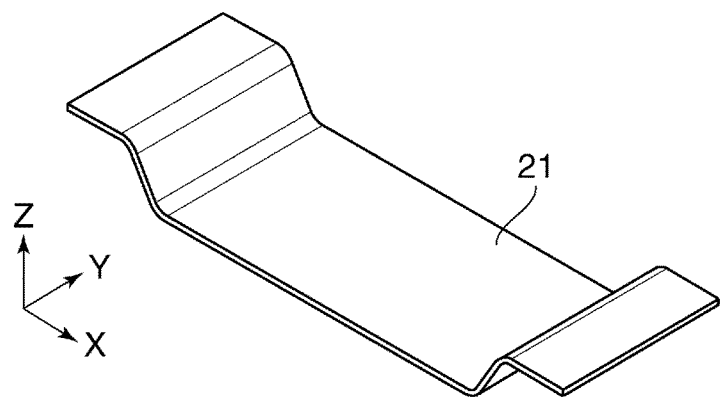
FIG. 9A, FIG. 9B, and FIG. 9C are perspective views showing examples of shapes of flat springs used for the vibration-type actuator shown in FIG. 7.
Figure 9B:
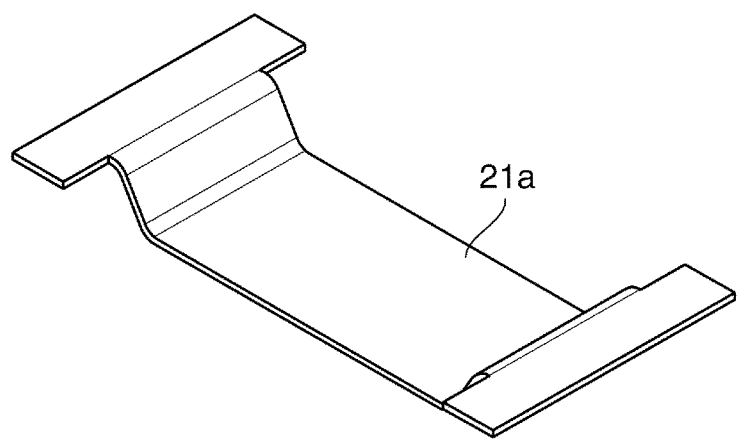
Figure 9C:
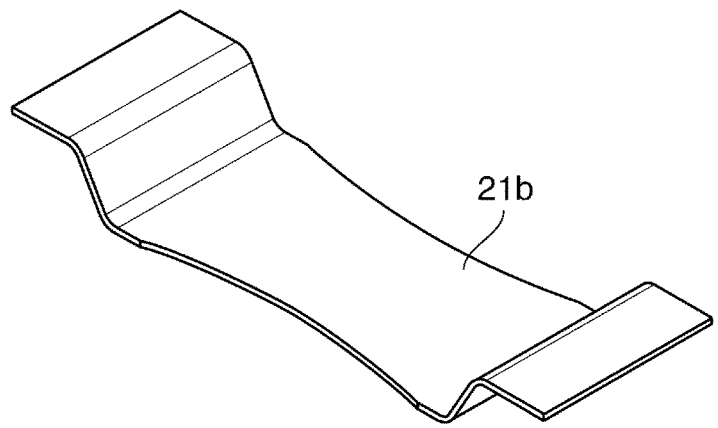
Figure 13:
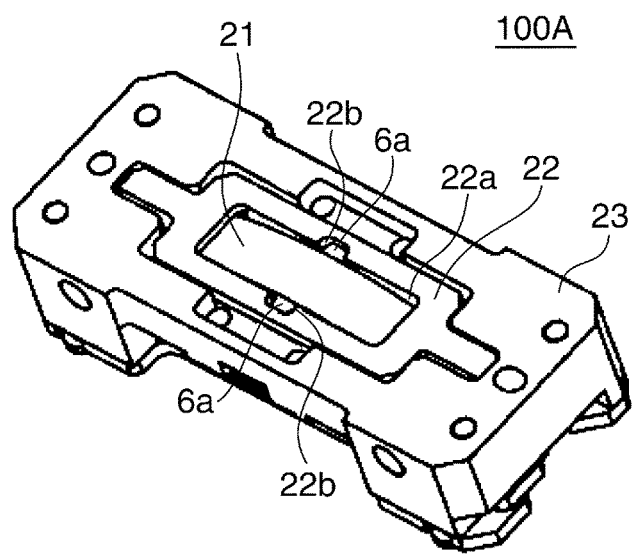
FIG. 13 is a perspective view showing a linear vibration-type actuator shown in FIG. 7 viewed from a bottom surface side thereof.

Since the vibration-type actuator 100A according to the second embodiment employs the flat spring 21 of a flex shape and the flat-spring support member 22 includes a penetration hole 22a which accommodates a flex portion of the flat spring 21 (movable area of energizing member) arranged at a bottom portion thereof, the thickness (the length in the Z-direction) becomes thinner than that of the vibration-type actuator 100 according to the first embodiment, and further miniaturization is attained. FIG. 9 is a perspective view showing examples of shapes of flat springs. The flat spring 21, a flat spring 21a, and a flat spring 21b shown in FIG. 9A, FIG. 9B, and FIG. 9C differ in the shape in the same manner as the differences among the flat springs 5, 5a, and 5b shown in FIG. 5A, FIG. 5B, and FIG. 5C. That is, the flat spring 21 shown in FIG. 9A has uniform width in the long-side direction. Moreover, a width of both ends of the flat spring 21a in the long-side direction is widened as shown in FIG. 9B, and a width in a central part of the flat spring 21b in the long-side direction is narrowed as shown in FIG. 9C. Since the effects of employments of the flat springs 21a and 21b are identical to the effects of employments of the flat springs 5a and 5b in the vibration-type actuator 100 according to the first embodiment, the descriptions are omitted. It should be noted that the flat spring 21 may have a flat shape as with the flat spring 5 disclosed in the first embodiment before being assembled to the vibration-type actuator 100A. In this case, since the penetration hole 22a accommodates the flex portion of the flat spring 21 when the flat spring 5 is assembled to the flat-spring support member 22 and then flexed, thinning and minimizing of the vibration-type actuator 100A can be attained. A shape of the flat spring 21 can be determined according to various restrictions in designing the vibration-type actuator 100A. Further, in the vibration-type actuator 100A, concave portions 22b into which the projections 6a of the pressure receiving member 6 are fitted are arranged at not the exterior members 23 but the flat-spring support member 22 (see FIG. 13). Accordingly, there is no necessity to provide the flat-spring support member 22 with penetration shapes through which the projections 6a penetrate, and hence degradation of strength of the flat-spring support member 22 can be avoided.

Incidentally, as shown in FIG. 8, the lengths A, B, C, and D are defined in the vibration-type actuator 100A as with the vibration-type actuator 100 according to the first embodiment. That is, the length of the contact area between the projections 11 and the driven body 2 in the width direction (the Y-direction) that intersects perpendicularly with the driving direction (the X-direction) of the driven body 2 is set to "A", and the length of the area that transfers the pressure force between the pressure receiving member 6 and the pressure transfer member 7 is set to "B". Moreover, the length of the area that transfers the pressure force between the pressure receiving member 6 and the flat spring 21 in the direction (the Y-direction) that intersects perpendicularly with the driving direction is set to "C", and the length of the area that transfers the pressure force between the flat spring 21 and the flat-spring support member 22 is set to "D". As described with reference to FIG. 4, when the centers of the two projections 11 in the width direction deviate from the center of the vibration body 1 in the width direction, the length A is the maximum length including the deviation between the two projections 11.

The vibration-type actuator 100A is also designed so that the lengths B, C, and D become longer than the length A (A<B, A<C, and A<D). As a result, the length of the pressure transfer area in which the pressure force is transferred to the vibration body 1 from the pressurizing unit is longer than the length of the contact area between the vibration body 1 and the driven body 2. Accordingly, even if the contact state between the two projections 1 and the driven body 2 varies, the state of the pressurizing unit does not vary, which enables to give the stable pressure force to the vibration body 1.

Figure 10:
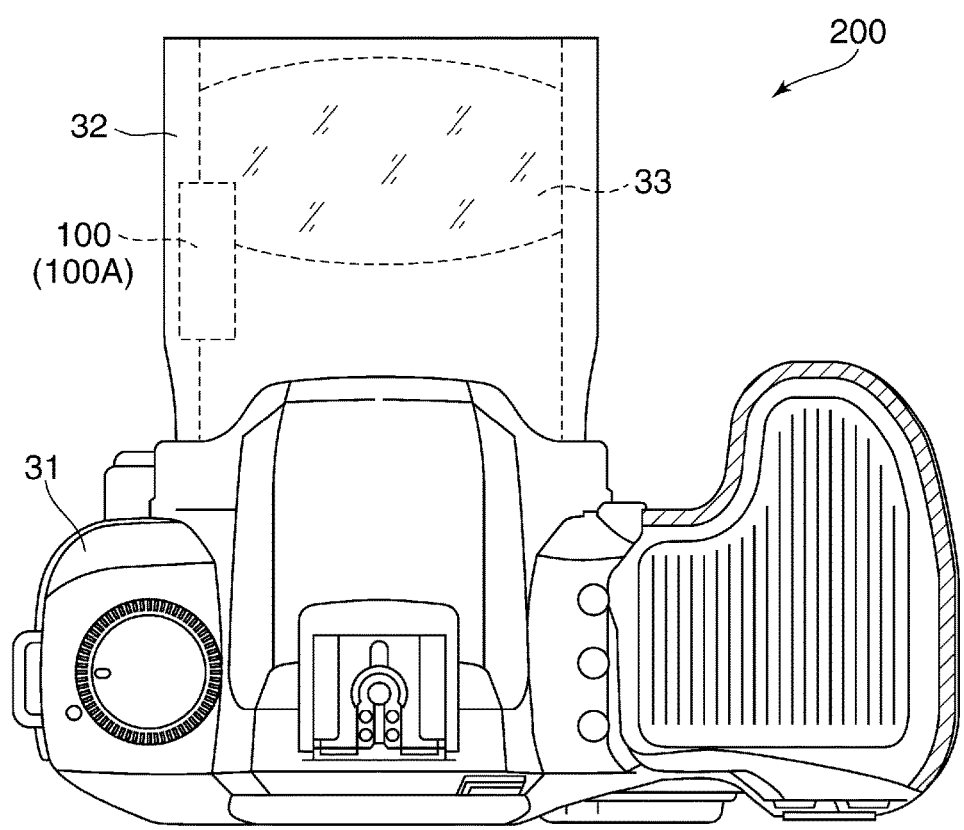
FIG. 10 is a view schematically showing a configuration of an image pickup apparatus to which the vibration-type actuator shown in FIG. 1A
Figure 11A:
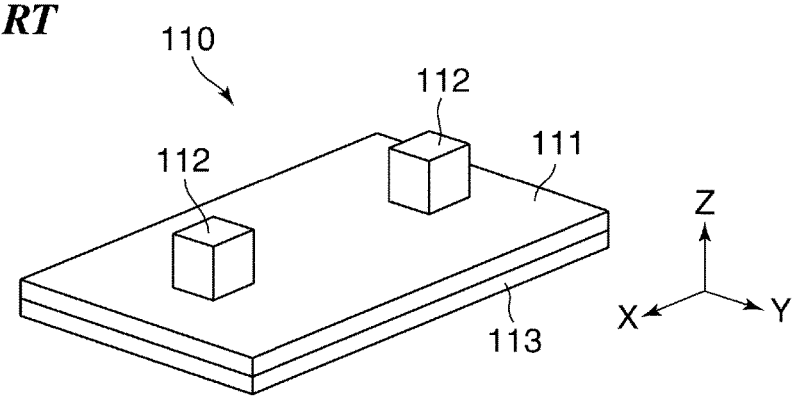
FIG. 11A, FIG. 11B, and FIG. 11C are views for describing outline configurations and oscillation modes of a well-known linear vibration-type actuator.
Figure 11B:
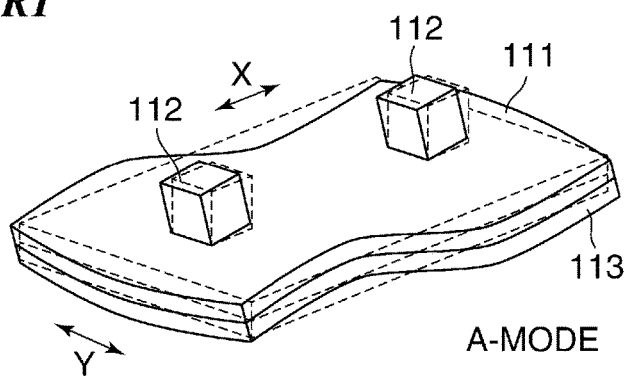
Figure 11C:
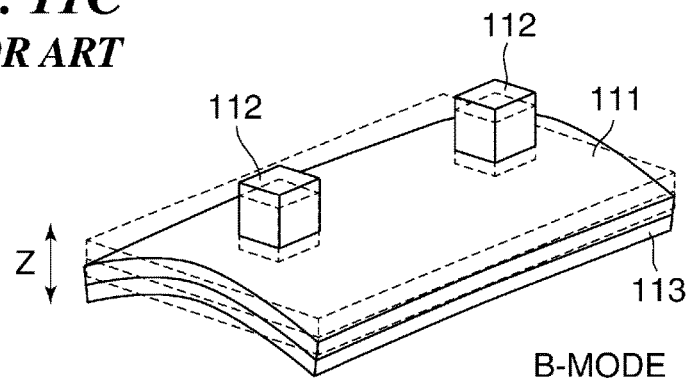

The vibration-type actuators 100 and 100A according to the above-mentioned embodiments are applicable to a lens barrel of an image pickup apparatus like a digital still camera that is an example of an optical device, for example. FIG. 10 is a view schematically showing a configuration of an image pickup apparatus 200 to which the vibration-type actuator 100 or 100A is applied. The image pickup apparatus 200 is what is called a single-lens reflex camera in which a lens barrel 32 can detach and attach freely to a camera body 31, and a focus lens 33 is held inside the lens barrel 32. The vibration-type actuator 100 (100A) is arranged inside the lens barrel 32, and the driven body 2 is connected to the focus lens 33. As a result, the vibration-type actuator 100 (100A) is used as a drive mechanism that controls the position of the focus lens 33 in an optical axis direction.

Usages of the vibration-type actuators 100 and 100A according to the above-mentioned embodiments are not only limited to the lens barrel of the image pickup apparatus, but they are applicable to also various linear drive apparatuses, and are applicable to also a rotary drive device. For example, the three vibration-type actuators 100 are arranged at equal intervals so that the projections 11 are located on the same circumference, and a ring-shape driven body that is rotatable on the center of the circumference is arranged so as to contact the projections 11. Then, the same drive voltage is applied to the three piezoelectric devices 3 to excite vibration in the vibration bodies 1, which drivingly rotates the driven body. Such a rotary drive device can be used as a rotary mechanism of a tip arm and a joint of an industrial robot, and as a rotary mechanism for a photoconductive drum, etc., in an image forming apparatus.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2014-145781, filed Jul. 16, 2014, and No. 2015-138847, filed Jul. 10, 2015, which are hereby incorporated by reference herein in their entireties.

What is claimed is:

1. A vibration-type linear actuator comprising:
 a drive unit having an electro-mechanical energy conversion element and a vibration body including a first projection;
 a driven body in pressure contact with the first projection; and
 a pressurizing unit configured to apply a pressure force between the first projection and the driven body, the pressurizing unit comprising:
 a pressurizing member; and
 a transfer unit configured to transfer the pressure force occurring in the pressurizing member to the vibration body,
 wherein the vibration body and the driven body are configured to change a relative position of the first projection and the driven body by vibration occurring in the vibration body when a drive voltage is applied to the electro-mechanical energy conversion element,
 wherein the transfer unit is disposed between the electro-mechanical energy conversion element and the pressurizing member while being in contact with both of the pressurizing member and one surface of the electro-mechanical energy conversion element, the one surface being opposite to a surface on which the vibration body is arranged, and
 wherein, in a direction that intersects perpendicularly with a relative moving direction of the vibration body and the driven body and that intersects perpendicularly with a pressurizing direction by the pressurizing unit, a length of an area in which the first projection is in contact with the driven body is shorter than a length of an area in which the pressurizing member is in contact with the transfer unit.

2. The vibration-type linear actuator according to claim 1, further comprising:
 a vibration-body support member comprising elastic material and configured to support the vibration body; and
 an exterior member configured to support the vibration-body support member.

3. The vibration-type linear actuator according to claim 1, wherein the transfer unit is in contact with the pressurizing member on a point or a line.

4. The vibration-type linear actuator according to claim 1, wherein the transfer unit comprises:
 a pressure receiving member in contact with the pressurizing member, and
 a transfer member configured to disperse the pressure force from the pressurizing member, the transfer member being disposed between the electro-mechanical energy conversion element and the pressure receiving member.

5. The vibration-type linear actuator according to claim 1, wherein the pressurizing member comprises a flat spring.

6. The vibration-type linear actuator according to claim 1, further comprising:
 a guide member disposed to overlap with the driven body when viewed in the direction that intersects perpendicularly with the relative moving direction and that intersects perpendicularly with the pressurizing direction, and extends in the relative moving direction.

7. The vibration-type linear actuator according to claim 1, further comprising a support member configured to support the pressurizing member,
 wherein the support member has a penetration hole in an area which at least overlaps with a movable area of the pressurizing member.

8. The vibration-type linear actuator according to claim 1, further comprising a support member configured to support the pressurizing member,
 wherein the transfer unit includes a second projection, the support member includes a concave portion into which the second projection is fitted, and the concave portion does not regulate movement of the transfer unit in the pressurizing direction.

9. The vibration-type linear actuator according to claim 1, wherein the vibration body includes two projections being in contact with the driven body, the two projections including the first projection and another projection.

10. The vibration-type linear actuator according to claim 1, further comprising a support member configured to support the pressurizing member,
 wherein, in the direction that intersects perpendicularly with the relative moving direction and that intersects perpendicularly with the pressurizing direction, the length of the area in which the first projection is in contact with the driven body is shorter than a length of an area in which the pressurizing member is in contact with the support member.

11. The vibration-type linear actuator according to claim 4, wherein, in the direction that intersects perpendicularly with the relative moving direction and that intersects perpendicularly with the pressurizing direction, the length of the area in which the first projection is in contact with the driven body is shorter than a length of an area in which the transfer member is in contact with the pressure receiving member.

12. The vibration-type linear actuator according to claim 9, wherein in the direction that intersects perpendicularly with the relative moving direction and that intersects perpendicularly with the pressurizing direction, a length of an area in which the two projections are in contact with the driven body is shorter than the length of the area in which the pressurizing member is in contact with the transfer unit, and
    wherein the length of the area in which the two projections are in contact with the driven body is the maximum length including deviation between the two projections.

13. An optical device comprising:
a lens; and
a vibration-type linear actuator comprising:
    a drive unit having an electro-mechanical energy conversion element and a vibration body including a first projection;
    a driven body in pressure contact with the first projection;
    a pressurizing unit configured to apply a pressure force between the first projection and the driven body, the pressurizing unit comprising:
    a pressurizing member; and
    a transfer unit configured to transfer the pressure force occurring in the pressurizing member to the vibration body,
wherein the vibration body and the driven body are configured to change a relative position of the first projection and the driven body by vibration occurring in the vibration body when a drive voltage is applied to the electro-mechanical energy conversion element,
wherein the transfer unit is disposed between the electro-mechanical energy conversion element and the pressurizing member while being in contact with both of the pressurizing member and one surface of the electro-mechanical energy conversion element, the one surface being opposite to a surface on which the vibration body is arranged, and
wherein, in a direction that intersects perpendicularly with a relative moving direction of the vibration body and the driven body and that intersects perpendicularly with a pressurizing direction by the pressurizing unit, a length of an area in which the first projection is in contact with the driven body is shorter than a length of an area in which the pressurizing member is in contact with the transfer unit.

\* \* \* \* \*